US012775109B2

(12) United States Patent
Vija

(10) Patent No.: US 12,775,109 B2
(45) Date of Patent: Oct. 27, 2026

(54) DIRECTIONAL ESTIMATION FOR RADIOACTIVE SOURCE LOCALIZATION IN SINGLE PHOTON EMISSION COMPUTED TOMOGRAPHY

(71) Applicant: Siemens Medical Solutions USA, Inc., Malvern, PA (US)

(72) Inventor: Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 153 days.

(21) Appl. No.: 18/823,827

(22) Filed: Sep. 4, 2024

(65) Prior Publication Data

US 2026/0063812 A1 Mar. 5, 2026

(51) Int. Cl.
*G01T 1/00* (2006.01)
*G01T 1/29* (2006.01)

(52) U.S. Cl.
CPC .................................. *G01T 1/2985* (2013.01)

(58) Field of Classification Search
CPC .............................. G01T 1/249; G01T 1/2985
See application file for complete search history.

(56) References Cited

U.S. PATENT DOCUMENTS 7,019,299 B2 3/2006 Albert
2018/0246224 A1* 8/2018 Ota ...................... G01T 1/2907
2020/0150297 A1 5/2020 Iniewski
2021/0290189 A1 9/2021 Vija et al.
2022/0015726 A1 1/2022 Vija
2022/0167936 A1 6/2022 Sundberg

FOREIGN PATENT DOCUMENTS

WO 2020032921 A1 2/2020
WO 2020032922 A1 2/2020
WO 2023244268 A1 12/2023

OTHER PUBLICATIONS

Anderson, Stephen E., Burcin Donmez, and Zhong He. "Sub-pixel position resolution in pixelated semiconductor detectors." 2007 IEEE Nuclear Science Symposium Conference Record. vol. 2. IEEE, 2007.

International App. No. PCT/US2023/070565, filing date Jul. 2, 2023.

(Continued)

*Primary Examiner* — Dani Fox

(57) ABSTRACT

For radioactive source localization, the SPECT system uses a spectroscopic, low spatial resolution detector to localize the Point-of-(first) Interaction (POI) within the detector sensor material in 3D ("3D detector" or "3D spectroscopic detector"), which in turn can be used to estimate the general direction of the source of emissions. By detecting the depth of the 3D POI, and emissions over the specified energy range, a processor may determine a direction towards the source. No shielding is needed as detected emissions from other directions may be discarded. Different shielding may be used to assist in directionality determination, such as different thickness profiles or material type by side of the detector, allowing directional determination by intensity.

17 Claims, 3 Drawing Sheets

(56) References Cited

OTHER PUBLICATIONS

Kim, Younghak, Taewoong Lee, and Wonho Lee. “Radiation measurement and imaging using 3D position sensitive pixelated CZT detector.” Nuclear Engineering and Technology 51.5 (2019): 1417-1427.
Morris, Eric Jude L., et al. “A backscattered x-ray imager for medical applications.” Medical Imaging 2005: Physics of Medical Imaging. vol. 5745. SPIE, 2005.

* cited by examiner

DIRECTIONAL ESTIMATION FOR RADIOACTIVE SOURCE LOCALIZATION IN SINGLE PHOTON EMISSION COMPUTED TOMOGRAPHY

BACKGROUND

The present embodiments relate to single photon emission computed tomography (SPECT), such as SPECT/computed tomography (CT) (SPECT-CT) or a stand-alone SPECT system. In SPECT, the gamma camera is typically shielded to prevent interference of radiation detection of signal from undesired radiation sources. Such interference could lead to wrong estimation of detection, localization, shape, or source strength, and if used in tomography to image artifacts. In general, shielding of electro-magnetic interference is desired and serves no other purposes than to "shield." For instance, lead (Pb) shields the entire gamma camera detector from stray and background radiation.

Shielding design modifies the response of the gamma camera detector to exclude signal from sources not in a defined field-of-view (FOV) of the gamma camera. The gamma camara is pointed at the desired source so that the shielding allows desired signal while preventing signal from undesired sources. In medical use, a patient is positioned on a patient handling system (PHS), and thus the system design and detector orientation are designed to image the radioactive source distribution on that PHS, defining the FOV of interest. Any other radiation not emanating from the spatial direction of the FOV is considered unwanted, and so shielding blocks signal from other directions. The energy range of operation may be limited, allowing the shield design to block signal in that range. However, where the PHS is not mechanically linked to the detector gantry or where the general location of the source distribution is not known, shielding may block desired signal. Shielding adds cost, weight and bulk (size)

SUMMARY

By way of introduction, the preferred embodiments described below include methods, systems, and detectors for radioactive source localization. The SPECT system uses a spectroscopic, low spatial resolution detector to localize the Point-of-(first) Interaction (POI) within the detector sensor material in 3D ("3D detector" or "3D spectroscopic detector"), which in turn can be used to estimate the general direction of the source of emissions. By detecting the depth of the 3D POI, and emissions over the specified energy range, a processor may determine a direction towards the source. No shielding is needed as detected emissions from other directions may be discarded. Different shielding may be used to assist in directionality determination, such as different thickness profiles or material type by side of the detector, allowing directional determination by intensity.

In a first aspect, a method is provided for radioactive source localization in a SPECT system. An emission from the radioactive source is detected in a 3D spectroscopic detector. A processor determines the direction of the radioactive source relative to the 3D spectroscopic detector based on a 3D location of the detection of the emission in the 3D spectroscopic detector. The SPECT system operates based on the direction, such as including an emission in a count or orienting the detector towards the source.

In a second aspect, a SPECT system includes a spectroscopic detector without shielding and a processor configured to count emissions detected by the spectroscopic detector and generate a SPECT image from the counted emissions.

In a third aspect, a SPECT system includes a gamma camera comprising a spectroscopic detector; a processor configured to locate depths of interactions of emissions with the spectroscopic detector, determine a direction of a radiation source relative to the gamma camera from the depths, include the emissions in a count only where the direction is from a first side of the gamma camera, and generate a SPECT image from the count; and a display configured to display the SPECT image.

Other aspects are summarized below in the Illustrative Embodiments. Any of the various aspects may be used in any combination. Aspects for one set and/or type of set (e.g., method or system) may be used in other sets or types of sets (e.g., system, method, or computer readable medium having stored thereon instructions (program product)).

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Directional estimation is provided for radioactive source localization. A 3D spectroscopic detector, with or without shielding, allows for directional finding or additional image formation. The 3D spectroscopic detector may detect the direction from which emissions are received, such as by the location in the 3D spectroscopic detector or spectrogram of detected emissions being closer to one side than another. This direction of the source may be used instead of shielding so that emissions from a desired source are counted and those from other directions are not counted.

The 3D spectroscopic detector may be used for security or medical purposes. Direction finding may be used in autonomous source finding, without actually imaging the source location using image formation device such as an imaging collimator, or Compton scattering for collimator less imaging. Since the direction may be determined by application of logic to the detection information, shielding is not needed. No shielding provides cost, reduced bulk, and weight advantages. Shielding may be used for another purpose than blocking unwanted emissions. Different material and/or thickness by side of the detector may be used to assist in direction finding. The intensity of the emission interaction with the 3D spectroscopic detector may indicate the side based on known attenuation caused by the shielding. By determining the side which received the emission, the direction is determined. Rather than collimating or blocking radiation, the shielding may be used to assist in two-dimensional (2D) or 3D source distribution estimation. The directional determination may be used to scan the surroundings to orient the 3D detector for scanning a particular source.

Figure 1:
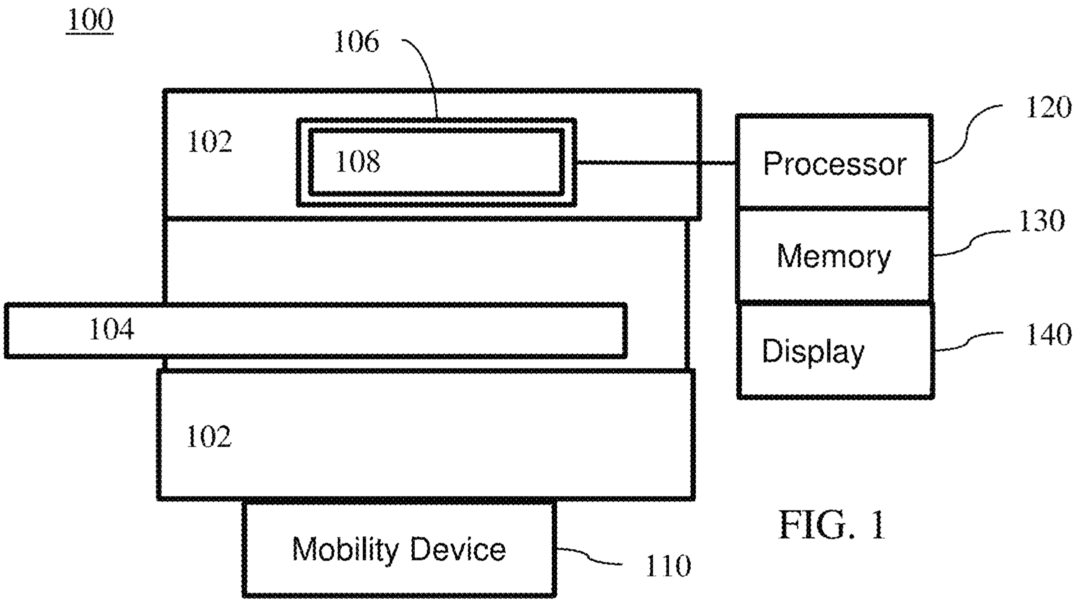
FIG. 1 is a block diagram of one implementation of a SPECT system with a 3D spectroscopic detector.

FIG. 1 shows an example implementation of a SPECT system using a 3D spectroscopic detector for source localization or direction finding. The depth, intensity, and/or spectroscopic information from detection of an emission or emissions by the 3D spectroscopic detector localizes the direction from which the emission was received. The direction of the radiation source relative to the gamma camera is determined, allowing for use without shielding or with shielding designed for purposes other than blocking or direction enforcement.

The SPECT system is an imaging system for imaging a patient on the bed 104. The gamma camera 106 formed by the 3D spectroscopic detector 108 detects emissions from the patient. Emissions from sources in other directions are detected, but not counted as the emissions are from other directions than the patient. In other implementations, the SPECT system is used on an autonomous vehicle, with robotic movement, and/or with manual guided movement to position the gamma camera 106 to detect emissions from a desired source. The direction finding is used to position the 3D detector for SPECT, such as for medical imaging or security examination.

Figure 5:
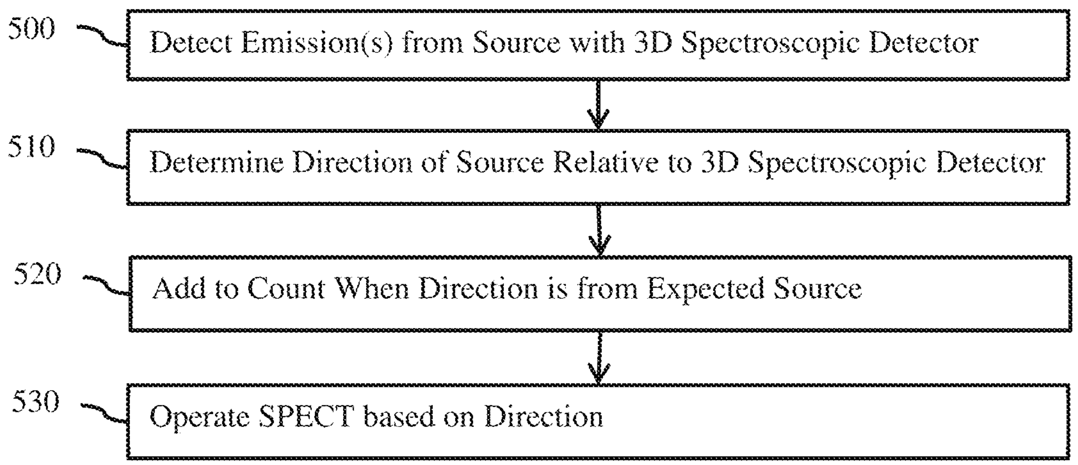
FIG. 5 is a flow chart diagram of an implementation of a method for localization of a radiation source in SPECT.

The SPECT system 100 implements the method of FIG. 5 or another method. The SPECT system 100 includes the gamma camera 106, housing 102, patient bed 104, mobility device 110, processor 120, memory 130, and/or display 140. Additional, different, or fewer components may be provided. For example, the bed 104 and/or mobility device 110 are not included. The processor 120, memory 130, and/or display 140 are a computer of the SPECT system 100, such as built into the housing 102 or in a same room or facility as the housing 102. In other approaches, the processor 120, memory 130, and/or display 140 are a separate server, computer, or workstation, such as a remotely connected computer.

The housing 102 is metal, plastic, fiberglass, carbon (e.g., carbon fiber), and/or other material. In one embodiment, different parts of the housing 102 are of different materials.

The housing 102 forms a patient region (e.g., bore) into which the patient is positioned for imaging. The bed 104 may move the patient within the patient region to scan different parts of the patient at different times. Alternatively, or additionally, a gantry holding the detector system moves the 3D spectroscopic detector 108. The system 100 has the bed 104 in a known or determined position relative to the gamma camera 106.

In other implementations, the bed 104 is disconnected or not registered (calibrated) to the gamma camera 106 or housing 102. The direction finding may be used to position the gamma camera 106 relative to the patient on the disconnected bed 104.

The mobility device 110 is a robot, such as a robotic arm, gantry, vehicle (e.g., tracked, wheeled, or rotation (e.g., drone) device with a power source and motor), and/or other movement device to move the gamma camera 106 within the SPECT system 100, move the SPECT system 100, and/or to position the gamma camera 106 to scan the patient or other object of interest. In another implementation, the mobility device 110 is a jointed arm, rail mounted base, vehicle, and/or swivel mount for manual movement of the gamma camera 106 based on direction information determined and output by the processor 120.

The gamma camera 106 is adjacent the patient region, such as mounted to a moveable gantry, or is positionable relative to the patient based on direction finding. The gamma camera 106 includes the 3D spectroscopic detector 108 or may include a tiled or celled arrangement of 3D spectroscopic detectors 108. The 3D spectroscopic detector 108 may be positioned in a frame, mounted to a carrier, and/or held between plates.

The 3D spectroscopic detector 108 is a semiconductor, such as a cadmium zinc telluride (CZT)-based semiconductor. The 3D spectroscopic detector 108 is a solid-state detector. Any material may be used that can be engineered to allow for 3D POI, such as thick (>5 mm) CZT. The 3D spectroscopic detector 108 is created with wafer fabrication at any thickness, however for the method to work best the thickness is at least 3 times larger than the depth resolution. Any transverse size may be used, such as about 2×2 cm. Co-axial detector geometries may be used.

Sub-mm resolution may be provided. The pixel size is set to allow for optimal depth resolution exploiting the small pixel effect in CZT, enabling cathode and temporal readout of electron and hole signals in CZT or another suitable material.

The 3D spectroscopic detector 108 is designed and configured to detect gamma emissions, such as emissions from a patient or other radiation sources. For example, the semiconductor is formed as an array of cells where anode electrodes define the detector cells. The 3D spectroscopic detector 108 has a polyhedron shape with any number of sides. For example, the 3D spectroscopic detector 108 is a cube or has a slab shape. Other shapes may be used.

Figure 2:
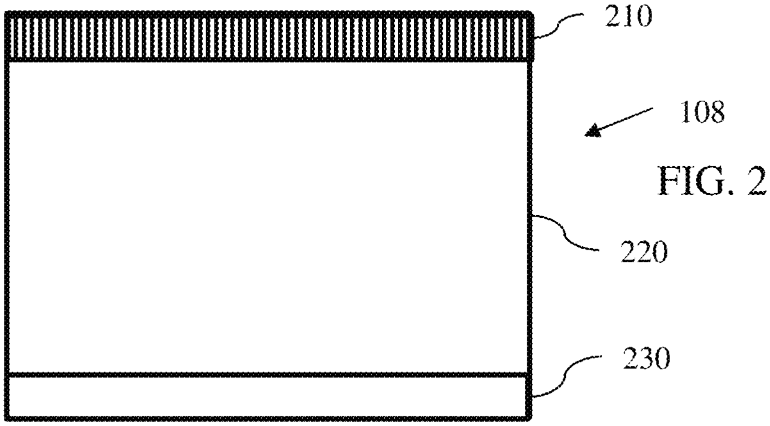
FIG. 2 is a cross-sectional view of an implementation of the 3D spectroscopic detector without shielding.

FIG. 2 shows a cross-section of an example 3D spectroscopic detector 108. Anode electrodes 210 and a cathode electrode 230 sandwiching the CZT or other crystalline material 220 are used to detect emissions that interact with the crystalline material 220. The anodes 210 are pixelated, forming an array of cells.

The anode and cathode electrodes 210, 230 are provided on opposite surfaces of the 3D spectroscopic detector 108. The anode electrodes 210 are conductors (e.g., conductive pads or traces) exposed on a surface of the 3D spectroscopic detector 108. The electrodes are electrically isolated from each other for separate electrical connections of the 3D spectroscopic detector 108.

The 3D spectroscopic detector 108 is used for directional estimation. The 3D spectroscopic detector 108 can be used to distinguish at least from what side an emission is received. The 3D spectroscopic detector 108 is a 3D or 4D (3D plus time) encoding spectroscopic detector (e.g., <4%, @ 140 keV). A weighting potential is designed to allow estimation of depth. The electron and hole mobility are different. The more different, the better the ability to estimate the depth of interaction within the crystal 220 (e.g., ratio electron/hole (mobility, mobility*lifetime)>>1).

The depth is used to determine on which side the emission entered. Without depth sensing, shielding is used to only receive emissions from a given direction, eliminating detection of stray and scattering radiation. The 3D spectroscopic detector 108 uses the pixelation of the anode electrode 210 to detect in 2D and the hole/electron mobility difference to detect the depth, providing detection of the location in 3D within the crystal 220 of interaction of the emission with the crystal 220. The 3D spectroscopic detector measures the signals in the anode and/or cathode generated by the drifting electrons and holes, generated by the impinging gamma ray creating an electron-hole pair at the first interaction point within the sensor. In essence, the ratio of incoming photon energy and band gap is proportional to the number of electron-hole pairs. The more signal is generated, i.e., more e-h pairs and thus e-h pairs could be detected with an ever sharper, higher peak. Such shape has small FWHM as compared to peak center energy and is considered as lower or better energy resolution. While less signal per unit energy detected yield a higher or poorer resolution detection. The 3D spectroscopic detector-based gamma camera 106 can determine periphery and hemisphere using detection location within the sensing crystal as well as the spectroscopic fingerprint, assuming knowledge of desired target isotope vs non-target isotope. The fingerprint may be used to distinguish radiation sources even from a same direction.

In one implementation, the 3D spectroscopic detector 108 is free of or is without shielding. A collimator is not provided. Lead, tungsten, or other metal does not cover any side of the 3D spectroscopic detector 108. FIG. 2 shows an example. While the detector 108 may be in the housing 102, there is no shielding to block radiation. Typically, the designers attempt to minimize the form factor. Rather than relying on a layer of material (i.e., shielding) to block emissions from any direction outside of the field of view, the 3D spectroscopic detector detects at least some of such emissions. The ability to apply logic to distinguish the general direction from which the emission propagated allows emissions from the desired field of view to be distinguished from those outside the desired field of view. "General" direction may include +/−45 degrees or a 90-degree range. By removing or not having detector shielding, cost, weight, and size advantages as compared to using shielding are provided for the detector assembly.

Figure 3:
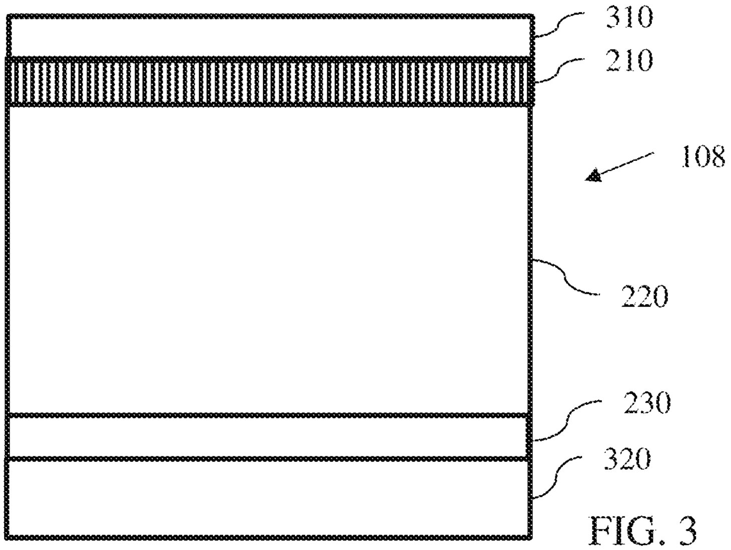
FIG. 3 is a cross-sectional view of an implementation of the 3D spectroscopic detector with different shielding on different sides.

In another implementation, shielding is provided on one or more sides of the 3D spectroscopic detector 108. Different shielding is provided on different sides. One or more sides may be free of shielding. FIG. 3 shows an example wherein one side (e.g., the side with the anode electrodes 210) has shielding 310, and another side (e.g., the side with the cathode electrode 230) has shielding 320. The other two sides shown in the cross-section of FIG. 3 do not have shielding. The two sides not shown also do not have shielding. Shielding may be provided on all sides, only one side, or more than two sides. The shielding is different on each side or the same on two or more sides.

The shielding may be different in material and/or thickness profile. The shielding material may attenuate but not block emissions in an energy range, such as the energy range of the expected or desired isotope. Alternatively, the shielding on one or more sides may block emissions in the energy range. Any metal may be used for shielding. The same or different metals at the same or different thicknesses may be used. FIG. 3 shows the shielding 320 on a back side being thicker than the shielding 310 on a front side. The same or different material is used. The differences result in different amounts of attenuation on different sides. The shielding attenuates by a known amount. Attenuation of a known or expected energy by the shield indicates the side through which the emission entered the 3D spectroscopic detector 108. The differences in shielding provide differences in attenuation, so that intensity measurements indicate the shielding through which the emission passed. The direction is determined from the intensity of the interaction.

In other implementations, the shielding may be coded. The shielding forms a pattern and/or enforces directionality. By having a shape caused by non-uniform shielding in thickness or material, the locations of emissions in 2D and/or spectrum (counts as a function of energy) indicates what shielding the emissions passed through, thus indicating the side through which the emission entered the 3D spectroscopic detector 108. The shape of the shadow represented by detection locations in 2D indicates the direction of the source.

The use of variable or different shielding per side (surrounding the gamma camera ("4*\Pi)) of the 3D spectroscopic gamma camera 106 allows for more efficient, accurate, and automated localization of sources. The shielding exploits Beer's law. According to Beer's law, the intensity is exponentially related to attenuation as a function of material and energy dependent gamma ray cross section as traversed in distance x in the material: $\text{Ln}(I_0/I)=\mu x$, where $\mu$=linear attenuation coefficient and a sum of cross section of the photo electric, Compton scattering and pair production, I is intensity at the location of interaction, and $I_0$ is the intensity at the surface of the shielding or 3D spectroscopic detector 108. In the 3D spectroscopic detector 108, the direction of the radiation is inferred by the radiation pattern and distribution in the crystal volume. Cathode and anode side radiation is differentiable. Side radiation triggers different edge pixels and fewer or no internal pixels, distinguishing emissions entering from the sides (verses front (anode side) or back (cathode side)).

The design of shielding enhances the desired effect by the geometry of front and backside, and/or other, shielding 310, 320. Beer's law accounts for the difference in shielding: $\text{Ln}(I0/I)=\mu*(fF(r)-fB(r)\cdot n)$; with n being a normal unit vector of radiation direction and r being a 3d vector of material 310, 320 with surface function fF(r), fB(r) describing front and back surface. To simplify, $fF(r)-fB(r)=f_{eff}(r)$. Given the material's attenuation properties, the shielding 310, 320 is different to enhance the directionality information. The difference in thickness and/or material results in different attenuation, which is used alone or with location of interaction to distinguish direction of the radiation source.

Where the shielding on different sides has variations or is patterned, the edges (e.g., sharp edges) forming the pattern create discontinuities. This results in a signal pattern in the detected emissions in the 3D spectroscopic detector 108. The pattern may be decoded to estimate flux directionality. The shape of the shadow from the shielding indicates the angle in 3D of the source relative to the 3D spectroscopic detector 108.

The location (e.g., depth) in the detector 108, the intensity (e.g., count rate) of the interaction, shape of shadow (e.g., flux directionality), and/or spectrum indicate the direction of the source relative to the 3D spectroscopic detector 108. Logic is applied by the processor 120 using instructions stored in the memory 130 to determine the direction for each emission or a collection of emissions. Rather than, or in addition to, relying on shielding, processor-implemented determination of direction based on detection is used to distinguish emissions from different directions.

The processor 120 is an image processor, general processor, central processing unit, control processor, graphics processor, digital signal processor, application specific integrated circuit, field programmable gate array, digital circuit, analog circuit, combinations thereof, or other now known or later developed device for determining direction, counting emissions, controlling the mobility device 110, and/or reconstructing a patient volume (i.e., object of the patient) from detected emissions. The processor 120 is a single device or multiple devices operating in serial, parallel, or separately. The processor 120 is specifically designed or provided for counting emissions or reconstruction but may be a main or general processor of a computer, such as a laptop or desktop computer, or may be a processor for handling tasks in a larger system. The processor 120 is configurable. The processor 120 is configured by software, firmware and/or hardware. Different software, firmware, and/or instructions are loaded or stored in memory 130 for configuring the processor 120.

In a SPECT imaging implementation, the processor 120 is configured to count emissions detected by the 3D spectroscopic detector 108. Emissions from a desired source (e.g., radioisotope in a patient) are counted, and emissions from undesired sources (e.g., other sources than the radioisotope in the patient) are not counted.

Figure 4:
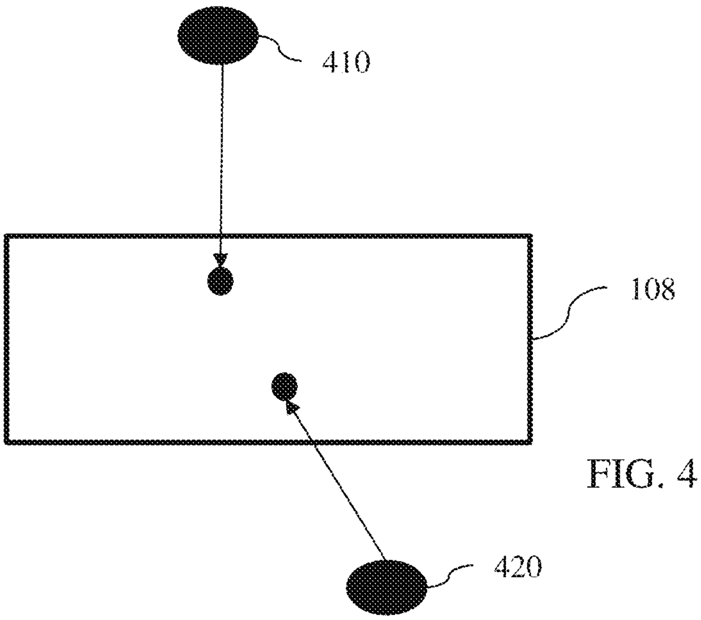
FIG. 4 illustrates example detection of directions to sources of radiation with the 3D spectroscopic detector.

The direction, energy, and/or spectrum are used to distinguish the sources. For example, the processor 120 is configured to determine a direction of the radiation source relative to the 3D spectroscopic detector 108 based on a depth in the 3D spectroscopic detector 108 at which the emissions are detected. FIG. 4 shows an example. The radiation or emissions from the source 410 enter from a front side of the detector 108, so interact at a depth near the front side. The radiation or emissions from the source 420 enter from a back side of the detector 108, so interact at a depth near the back side. The processor 120 identifies the location of interaction to distinguish between the front or back directions. Similarly, the depth or location of interaction from a side (not front or back) indicates the direction being to the side.

The intensity, spectroscopic fingerprint (i.e., energy as a function of count), attenuation, and/or flux directionality may be used instead or with the location of interaction to determine the direction of the source 410 relative to the 3D spectroscopic detector 108. For example, the intensity reflects the attenuation. Where different shielding is provided on different sides, the resulting intensities of the interactions are different depending on the side through which the emissions entered. The intensity and/or location indicate the direction. As another example, the shadowing caused by a pattern in the shielding indicates the direction. The shape of the shadow shows direction.

Any resolution for direction may be provided. For example, the direction is treated as one of six directions of the six-sided detector 108. Greater resolution, such as from variance in depth from a side for a collection of emissions, flux directionality, and/or other source, may be provided. A group of interactions on adjacent sides may indicate a non-normal direction.

The processor 120 is configured to add the emissions from one direction and not add emissions from other directions. In the example from FIG. 4, the processor 120 counts the emissions from the source 410 but does not count or include emissions from the source 420. This decision is based on the direction and/or energy. The included counts (e.g., included emissions in the count) are used to generate a SPECT image (e.g., tomographic reconstruction). The emissions from other sources or directions are not used to generate the SPECT image.

In another implementation, the processor 120 determines direction to orient the gamma camera 106 to the radiation source 410. For example, the location in the detector 108 and/or energy level (i.e., intensity) are used to determine direction. In one implementation, different shielding is provided on different sides. The side with directional or no shielding is oriented towards the source 410 for operating the mobility device 110. The direction sensing is used to orient the detector 108 for imaging or other purpose.

In one example, the 3D spectroscopic detector 108 uses different sides to detect emissions at different energy levels. The gamma camera 106 is oriented to face the side for a given energy range at the source outputting radiation in that energy range. For example, a collimator may be on one side but not on another side. The side with the collimator is oriented for imaging at a low (e.g., <200 keV) and/or medium (e.g., 200-400 keV) range. Different apertures (e.g., coded aperture, time-encoded coded aperture, and no aperture) may be provided on different sides of the detector 108. The 3D spectroscopic detector 108 may be used to assist and/or perform image formation for a wide energy spectrum from "low energy" ca.<200 keV, medium energy 200-400 keV, high energy 400 keV-900 keV, to very high energy>900 keV. For high and very high energy, Compton or other image formation is used without a collimator, coded aperture, or time-encoded coded apertures.

If very high energy emissions are to be assessed, the shielding can be designed to not only shape the intensity profile of the primary emission but design a spectroscopic emission profile to assist in Compton imaging. Compton imaging applications operate at emission energies beyond physical image formation using collimator, coded apertures, and time encoded Coded apertures (e.g., >511 keV; CI). The 3D spectroscopic detector 108 may be positioned to find a direction of the radiation source, such as using a collimator and rotation of the detector 108 with the collimator to guide to the source. The detector 108 is then rotated to a side with no shielding to operate as a Compton detector. By determining the direction of the source, the Compton detector may be oriented to more efficiently sense the high energy emissions, which can be used in a multi spectral reconstruction. This approach is applicable for both in-crystal Compton imaging and dedicated scattering and catcher configurations with designed shielding for the scattering detector and catching detector. In the scatter-catcher design, the space between scattering and catcher detectors is used to shape the catcher efficiency (see US2021/0290189). The direction sensing is used for assisting formation of the image from Compton sensing (i.e., Compton image as the SPECT image), or for operational efficiency to guide a mobile system to approach the source as a target.

The processor 120 controls the mobility device 110 to rotate and/or translate the 3D spectroscopic detector 108 so that the source 410 is in the field of view of the desired side of the detector 108. A robotic arm, swivel mount, and/or autonomous vehicle (e.g., wheeled cart, drone, or tracked system) moves the 3D spectroscopic detector 108 to efficiently receive emissions from the desired source 410. For example, a medical SPECT system may seek out a patient who has ingested a radioisotope. The direction is determined, and the mobility device 110 moves the detector 108 to be closer to the patient. The direction sensing may be used for autonomously approaching a source, such as described in US2022/015726.

In another implementation, one side of the 3D spectroscopic detector 108 is used to guide (i.e., control the mobility device 110 and/or output instructions for moving the SPECT system), and another side of the 3D spectroscopic detector 108 is used to detect emissions for generating a SPECT image. The detector 108 is oriented to guide and detect for imaging at different times.

The display 140 is a monitor, LCD, plasma, touch screen, printer, or other device for displaying an image for viewing by a user. The display 140 shows one or more SPECT images representing function (i.e., representing the activity of the reconstructed object), such as uptake or activity concentration. The image is a quantitative or qualitative SPECT. The image may be a volume rendering, a multi-planar reconstruction, a cross-section, and/or another image from a final image object. The image represents a distribution of the radionuclide in the patient based on detected emissions. Other information may be displayed, such as guidance in where or how to move the gamma camera 106 based on the direction sensing.

The memory 130 is a random-access memory, graphics processing memory, video random access memory, system memory, cache memory, hard drive, optical media, magnetic media, flash drive, buffer, database, combinations thereof, or other now known or later developed memory device for storing data. The memory 130 stores detected emissions (e.g., SPECT detected event data), reconstructed objects, calculated direction, and/or other information used in the processes described herein.

The memory 130 or other memory is a non-transitory computer readable storage medium storing data representing instructions executable by the programmed processor 120. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

FIG. 5 shows one implementation of a flow chart of a method for radioactive source localization in a SPECT system. A gamma camera formed from a 3D spectroscopic detector acquires data suitable for processing to estimate 3D or 4D activity distribution for emission energies bellow 3000 KeV. The estimate of the activity distribution is in "image" space, and data from the 3D spectroscopic gamma camera is "data" space. 3D or 4D activity distribution includes estimates of local amounts of activity density. 4D refers to the ability to image temporal varying 3D activity distributions, with temporal resolution limited by the statistical noise in the data, which is directly related to the injected dose of the radiopharmaceutical and the sensitivity of the image formation method.

The 3D spectroscopic gamma camera allows sensing of direction of the radiation source relative to the camera. This direction information may be used to eliminate the need for shielding and/or allow for shielding to be used for other purposes than blocking emissions.

The method is implemented by the system of FIG. 1 or another system. A 3D detector detects emissions in act 500, and a processor determines the direction in act 510, adds to the count based on direction in act 520, and/or operates the SPECT system based on the direction in act 530. Other components may perform the acts.

The acts are performed in the order shown (i.e., top-to-bottom or numerically) or another order. For example, act 530 is performed prior to act 520.

Additional, different, or fewer acts may be provided. For example, act 520 and/or act 530 are not performed. As another example, an act for configuring the SPECT system and/or an act for generating a SPECT image are provided.

In act 500, the 3D spectroscopic or other 3D detector detects one or more emissions from a radioactive source. The interaction of the emission with the detector is detected in the 3D detector.

The depth of interaction is detected. The intensity, spectrum, shadow, and/or other information may be detected.

The detection occurs without interference from shielding. The detector is free of shielding. In other approaches, the detector has different shielding on different sides. The difference in thickness profile, material, and/or material pattern of the shielding may be used to help distinguish the direction of the source relative to the detector in act 510. The shielding enhances the estimate for source location in autonomous source or other direction-finding applications. The detection is responsive to the differences in shielding, such as detecting the intensity and/or flux directionality.

In act 510, the processor determines a direction of the radioactive source relative to the 3D spectroscopic detector. The direction is determined based on a location of the detection of the emission in the 3D spectroscopic detector. For example, the depth and/or interaction in only a side pixel is used to determine from which side of the detector the source is located. Groups of emissions determined as being from two or three adjacent sides and the same source (e.g., energy level and/or spectrum) may indicate a direction non-normal to any of the sides. The depth of the interaction indicates the side. The interaction being at a side pixel indicates the side. The side of the detector indicates the direction of the source.

In one implementation, the difference in shielding is used to help detect the direction. The differences in shielding results in attenuation, so detection at different energy. By having different material and/or thickness on different sides, the energy may indicate the side on which the emission entered the detector. The intensity of the interaction indicates the direction. For example, Beer's law is used to determine the side. As another example, a pattern of emissions and/or intensities of emissions is used. The shadow from shielding in a pattern (e.g., shielding with a pattern of sharp edges coding an aperture) indicates the direction. The shape of the shadow is different depending on the direction of the source relative to the shielding. The discontinuities in emissions produced by the shielding pattern on the detector are decoded to estimate the flux directionality.

In act 520, the processor determines whether to add a detected emission to a count. The determination is based on the direction. Rather than or in addition to using shielding to block undesired emissions, the direction of the source relative to the detector indicates whether the source is of interest (e.g., is the patient). The direction being from a front or desired side of the detector indicates that the emission is from the desired source. Emissions from other directions (e.g., sides of the detector) are not included in the count.

In act 530, the processor operates the SPECT system or SPECT system itself operates based on the direction. The SPECT system is controlled to operate, at least in part, using the direction.

In a medical imaging example, the processor generates a SPECT image from counts of emissions at different pixels of the detector. The emissions included in the counts are based on the direction. Emissions from a desired target (e.g., direction of the patient) are included in the counts, and emissions from other sources (other directions and/or with different energies) are not included in the counts. The activity distribution is estimated from the counts. Tomographic image formation or image formation using or supported by other information or extra modal data (e.g., computed tomography) may be used.

In another example for security or medical imaging, the processor guides the SPECT system to the radiation source based on the direction. The SPECT system operates to move the gamma camera to or towards the radiation source, such as autonomously driving the gamma camera to a patient or object for security examination. Alternatively, the SPECT system operates to display instructions to the user for manually guiding the gamma camera to the patient or object.

As one approach, one or more (e.g., all or only a subset) of sides of the detector are used for guiding. For example, one side is oriented normal to the direction, and used to guide the gamma camera to the source (e.g., use patterned shielding on that side for flux directionality). A different side (e.g., unshielded or collimated) of the 3D spectroscopic detector is then oriented towards the radiation source for performing SPECT imaging. Some emissions are used for guiding, and then additional emissions are used for imaging.

Given the detected, expected, or known energy of the source, the side of the 3D spectroscopic detector with shielding arranged for the energy range is oriented to the source for imaging. The energy of the emissions from the source is used to select the side to orient towards the source. In medical imaging, a side with a collimator or other shielding used for imaging without detecting the energy level may be oriented to the source (e.g., patient).

In another example, the processor operates the SPECT system for Compton imaging. The Compton detector or detectors are oriented relative the source so emissions from the source are more likely to interact with the scatter detector, and the resulting scatter is more likely to interact with the catcher detector. The Compton imaging is operated with the radiation source localized relative to the Compton detector(s).

Any generated SPECT images, guidance, or other detected information is displayed to the user. The information may additionally, or instead, be transferred over a computer network and/or stored in memory.

The following is a list of non-limiting Illustrative Embodiments disclosed herein. The illustrative embodiments below summarize aspects or features of the first, second, and third aspects in the summary above. Aspects or features used for one type of illustrative embodiment (e.g., method or system) may be used in other types.

Illustrative Embodiment 1. A method for radioactive source localization in a single photon emission computed tomography (SPECT) system, the method comprising: detecting an emission from the radioactive source in a three-dimensional (3D) spectroscopic detector; determining, by a processor, a direction of the radioactive source relative to the 3D spectroscopic detector based on a location of the detection of the emission in the 3D spectroscopic detector; and operating the SPECT system based on the direction.

Illustrative Embodiment 2. The method of Illustrative Embodiment 1, wherein detecting comprises detecting where the 3D spectroscopic detector is free of shielding.

Illustrative Embodiment 3. The method of any of Illustrative Embodiments 1-2, wherein detecting comprises detecting where the 3D spectroscopic detector has different material, material thickness, and/or material pattern on different sides, and wherein determining comprises determining based, at least in part, the difference.

Illustrative Embodiment 4. The method of Illustrative Embodiment 3, wherein detecting comprises detecting where the different material pattern is on the different sides, and wherein determining comprises decoding an estimate of flux directionality.

Illustrative Embodiment 5. The method of any of Illustrative Embodiments 3-4, wherein detecting comprises detecting where the different material and/or different thickness is on the different sides, and wherein determining comprises determining based, at least in part, on Beer's law.

Illustrative Embodiment 6. The method of any of Illustrative Embodiments 1-5, wherein detecting comprises detecting a depth of interaction of the emission with the 3D spectroscopic detector, and wherein determining comprises determining the direction from the depth as the location.

Illustrative Embodiment 7. The method of Illustrative Embodiment 6, further comprising adding the detection of the emission as a count where the direction of the radiation source places the radiation source on a first side of the 3D spectroscopic detector and not adding the detection where the direction of the radiation source places the radiation source on a second side of the 3D spectroscopic detector, and wherein operating a SPECT system comprises generating a SPECT image from the count.

Illustrative Embodiment 8. The method of any of Illustrative Embodiments 1-7, wherein operating the SPECT system comprises guiding the SPECT system to the radiation source based on the direction.

Illustrative Embodiment 9. The method of Illustrative Embodiment 8, wherein guiding comprises using a first side of the 3D spectroscopic detector for guiding based on the direction determined from the detecting, and wherein operating the SPECT system further comprises orienting a different side of the 3D spectroscopic detector towards the radiation source and performing SPECT imaging using additional emissions detected with the different side oriented towards the radiation source.

Illustrative Embodiment 10. The method of any of Illustrative Embodiments 1-9, wherein operating the SPECT system comprises orienting one of different sides of the 3D spectroscopic detector towards the radiation source, the one being selected by the processor based on an energy of the emission.

Illustrative Embodiment 11. The method of any of Illustrative Embodiments 1-10, wherein operating the SPECT system comprises operating for Compton imaging with the radiation source localized relative Compton detectors.

Illustrative Embodiment 12. A single photon emission computed tomography (SPECT) system comprising: a three-dimensional (3D) spectroscopic detector without shielding; and a processor configured to count emissions detected by the 3D spectroscopic detector and generate a SPECT image from the counted emissions.

Illustrative Embodiment 13. The SPECT system of Illustrative Embodiment 12, wherein the processor is configured to determine a direction of a radiation source relative to the 3D spectroscopic detector based on a depth in the 3D spectroscopic detector at which the emissions are detected and based on a spectroscopic fingerprint and is configured to add the emissions and not add emissions based on the direction.

Illustrative Embodiment 14. A single photon emission computed tomography (SPECT) system comprising: a gamma camera comprising a three-dimensional (3D) spectroscopic detector; a processor configured to locate depths of interactions of emissions with the 3D spectroscopic detector, determine a direction of a radiation source relative to the gamma camera from the depths, include the emissions in a count only where the direction is from a first side of the gamma camera, and generate a SPECT image from the count; and a display configured to display the SPECT image.

Illustrative Embodiment 15. The SPECT system of Illustrative Embodiment 14, wherein the 3D spectroscopic detector is free of shielding.

Illustrative Embodiment 16. The SPECT system of any of Illustrative Embodiments 14-15, further comprising different shielding on different sides of the 3D spectroscopic detector, and wherein the processor is configured to determine the direction based on intensities of the interactions.

Illustrative Embodiment 17. The SPECT system of Illustrative Embodiment 16, wherein the processor is configured to orient the gamma camera to the radiation source based on an energy level of the interactions, the 3D spectroscopic detector having different sides for different energy ranges.

Illustrative Embodiment 18. The SPECT system of any of Illustrative Embodiments 14-17, further comprising a mobility device, and wherein the processor is configured to guide the gamma camera to the radiation source based on the direction.

Illustrative Embodiment 19. The SPECT system of Illustrative Embodiment 18, wherein the processor is configured to use a first side of the 3D spectroscopic detector to guide and a second side of the 3D spectroscopic detector to include in the count and generate the SPECT image.

Illustrative Embodiment 20. The SPECT system of any of Illustrative Embodiments 14-19, wherein the processor is configured to generate the SPECT image as a Compton image with the direction being used in generation of the Compton image.

While the invention has been described above by reference to various embodiments, many changes and modifications can be made without departing from the scope of the invention. It is therefore intended that the foregoing detailed description be regarded as illustrative rather than limiting, and that it be understood that it is the following claims, including all equivalents, which are intended to define the spirit and scope of this invention.

I claim:

1. A method for radioactive source localization in a single photon emission computed tomography (SPECT) system, the method comprising:

detecting an emission from the radioactive source in a three-dimensional (3D) spectroscopic detector, wherein the 3D spectroscopic detector has different material, material thickness, and/or material pattern on different sides;

determining, by a processor, a direction of the radioactive source relative to the 3D spectroscopic detector based on a location of the detection of the emission in the 3D spectroscopic detector and at least in part on a difference in the material, material thickness, and/or material pattern of the spectroscopic detector; and operating the SPECT system based on the direction.

2. The method of claim 1, wherein detecting comprises detecting where the different material pattern is on the different sides, and wherein determining comprises decoding an estimate of flux directionality.

3. The method of claim 1, wherein detecting comprises detecting where the different material and/or different thickness is on the different sides, and wherein determining comprises determining based, at least in part, on Beer's law.

4. The method of claim 1, wherein detecting comprises detecting a depth of interaction of the emission with the 3D spectroscopic detector, and wherein determining comprises determining the direction from the depth as the location.

5. The method of claim 4, further comprising adding the detection of the emission as a count where the direction of the radiation source places the radiation source on a first side of the 3D spectroscopic detector and not adding the detection where the direction of the radiation source places the radiation source on a second side of the 3D spectroscopic detector, and wherein operating a SPECT system comprises generating a SPECT image from the count.

6. The method of claim 1, wherein operating the SPECT system comprises guiding the SPECT system to the radiation source based on the direction.

7. The method of claim 6, wherein guiding comprises using a first side of the 3D spectroscopic detector for guiding based on the direction determined from the detecting, and wherein operating the SPECT system further comprises orienting a different side of the 3D spectroscopic detector towards the radiation source and performing SPECT imaging using additional emissions detected with the different side oriented towards the radiation source.

8. The method of claim 1, wherein operating the SPECT system comprises orienting one of different sides of the 3D spectroscopic detector towards the radiation source, the one being selected by the processor based on an energy of the emission.

9. The method of claim 1, wherein operating the SPECT system comprises operating for Compton imaging with the radiation source localized relative Compton detectors.

10. A single photon emission computed tomography (SPECT) system comprising:

a spectroscopic detector without shielding;

a mobility device; and a processor configured to count emissions detected by the spectroscopic detector, determine a direction of a radiation source relative to the spectroscopic detector based on a location of the detection of the emissions, guide the mobility device to the radiation source based on the direction, and generate a SPECT image from the counted emissions.

11. The SPECT system of claim 10, wherein the processor is configured to determine a direction of a radiation source relative to the spectroscopic detector based on a depth in the spectroscopic detector at which the emissions are detected and based on a spectroscopic fingerprint and is configured to add the emissions and not add emissions based on the direction.

12. A single photon emission computed tomography (SPECT) system comprising:

a gamma camera comprising a spectroscopic detector;

a processor configured to locate depths of interactions of emissions with the spectroscopic detector, determine a direction of a radiation source relative to the gamma camera from the depths, include the emissions in a count only where the direction is from a first side of the gamma camera, and generate a SPECT image from the count;

a mobility device, wherein the processor is configured to guide the gamma camera to the radiation source based on the direction; and a display configured to display the SPECT image.

13. The SPECT system of claim 12, wherein the spectroscopic detector is free of shielding.

14. The SPECT system of claim 12, further comprising different shielding on different sides of the spectroscopic detector, and wherein the processor is configured to determine the direction based on intensities of the interactions.

15. The SPECT system of claim 14, wherein the processor is configured to orient the gamma camera to the radiation source based on an energy level of the interactions, the spectroscopic detector having different sides for different energy ranges.

16. The SPECT system of claim 12, wherein the processor is configured to use a first side of the spectroscopic detector to guide and a second side of the spectroscopic detector to include in the count and generate the SPECT image.

17. The SPECT system of claim 12, wherein the processor is configured to generate the SPECT image as a Compton image with the direction being used in generation of the Compton image.

* * * * *